United States Patent
Mizuguchi et al.

(10) Patent No.: US 10,351,670 B2
(45) Date of Patent: *Jul. 16, 2019

(54) AROMATIC POLYKETONE, METHOD OF PRODUCING THE SAME, AROMATIC POLYKETONE COMPOSITION, AROMATIC POLYKETONE FILM, OPTICAL ELEMENT, AND IMAGE DISPLAY APPARATUS

(71) Applicant: HITACHI CHEMICAL COMPANY, LTD., Tokyo (JP)

(72) Inventors: Nanako Mizuguchi, Tokyo (JP); Hiroshi Matsutani, Tokyo (JP); Satoshi Asaka, Tokyo (JP); Misao Inaba, Tokyo (JP); Katsuya Maeyama, Yamagata (JP)

(73) Assignee: HITACHI CHEMICAL COMPANY, LTD., Tokyo (JP)

( * ) Notice: Subject to any disclaimer, the term of this patent is extended or adjusted under 35 U.S.C. 154(b) by 15 days.

This patent is subject to a terminal disclaimer.

(21) Appl. No.: 15/548,475

(22) PCT Filed: Jan. 27, 2016

(86) PCT No.: PCT/JP2016/052363
§ 371 (c)(1),
(2) Date: Aug. 3, 2017

(87) PCT Pub. No.: WO2016/125660
PCT Pub. Date: Aug. 11, 2016

(65) Prior Publication Data
US 2018/0237588 A1      Aug. 23, 2018

(30) Foreign Application Priority Data
Feb. 4, 2015   (JP) .................................. 2015-020442

(51) Int. Cl.
*C08G 67/00*   (2006.01)
*C09D 173/00*   (2006.01)
*G02B 1/04*   (2006.01)

(52) U.S. Cl.
CPC .......... *C08G 67/00* (2013.01); *C09D 173/00* (2013.01); *G02B 1/04* (2013.01)

(58) Field of Classification Search
CPC ........ C08G 67/00; C09D 173/00; G02B 1/04; G02F 1/1335
(Continued)

(56) References Cited

FOREIGN PATENT DOCUMENTS

JP   S62-007730 A   1/1987
JP   2000-290365 A   10/2000
(Continued)

OTHER PUBLICATIONS

JP 2013-053194 A, machine translation, JPO Japan Platform for Patent Information (J-PlatPat). (Year: 2000).*
(Continued)

*Primary Examiner* — Josephine L Chang
(74) *Attorney, Agent, or Firm* — Fitch, Even, Tabin & Flannery, L.L.P.

(57) ABSTRACT

An aromatic polyketone including, in a structural unit, at least one alicyclic skeleton and at least one carbon atom bound by two rotatable single bonds, or an aromatic polyketone including a structural unit represented by the following Formula (1), the following Formula (2), or the following Formula (4), and a structural unit represented by the following Formula (5) is provided.
(Continued)

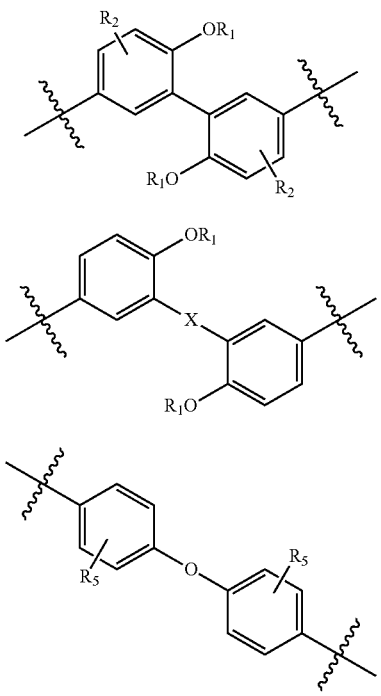

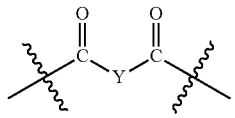

16 Claims, 1 Drawing Sheet

(58) Field of Classification Search
USPC .......................................................... 524/604
See application file for complete search history.

(56) References Cited

FOREIGN PATENT DOCUMENTS

| | | |
|---|---|---|
| JP | 2005-272728 A | 10/2005 |
| JP | 2013-053194 A | 3/2013 |

OTHER PUBLICATIONS

JP 2000-290365 A, machine translation, JPO Japan Platform for Patent Information (J-PlatPat). (Year: 2013).*
International Search Report for PCT/JP2016/052363 dated Apr. 5, 2016; English translation submitted herewith (5 pages).

\* cited by examiner

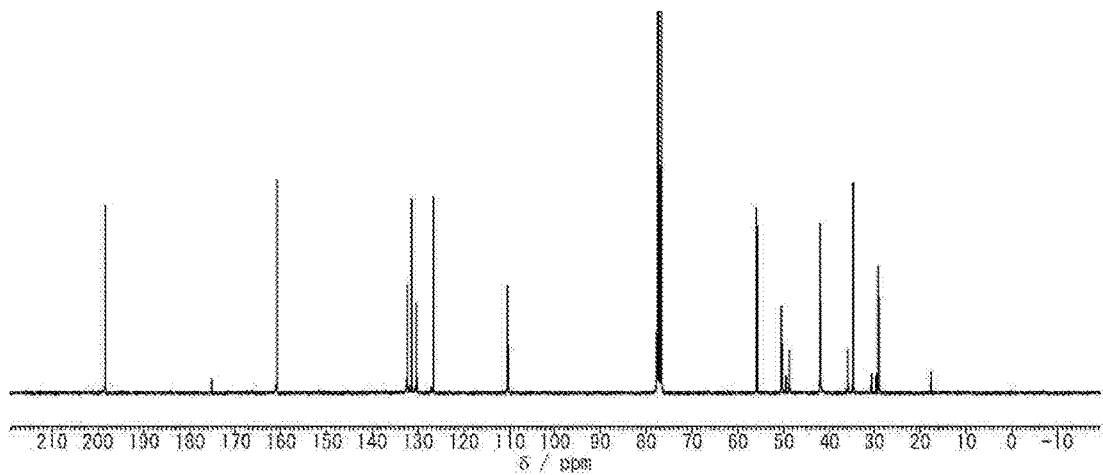

AROMATIC POLYKETONE, METHOD OF PRODUCING THE SAME, AROMATIC POLYKETONE COMPOSITION, AROMATIC POLYKETONE FILM, OPTICAL ELEMENT, AND IMAGE DISPLAY APPARATUS

CROSS-REFERENCE TO RELATED APPLICATIONS

This application is a U.S. national phase application filed under 35 U.S.C. § 371 of International Application No. PCT/JP2016/052363, filed Jan. 27, 2016, designating the United States, which claims priority from Japanese Patent Application No. 2015-020442, filed Feb. 4, 2015, which are hereby incorporated herein by reference in their entirety.

TECHNICAL FIELD

The present invention relates to an aromatic polyketone, a method of producing an aromatic polyketone, an aromatic polyketone composition, an aromatic polyketone film, an optical element, and an image display apparatus.

BACKGROUND ART

Aromatic polyketones having an aromatic ring and a carbonyl group in the main chain, disclosed in Japanese Patent Application Laid-Open (JP-A) No. S62-7730 and the like, have excellent heat resistance and mechanical characteristics. The aromatic polyketones have been used as engineering plastics. Most of polymers belonging to the aromatic polyketones are aromatic polyether ketones polymerized using nucleophilic aromatic substitution reaction, and have an ether bond in the main chain. In contrast, aromatic polyketones having no ether bond in the main chain, disclosed in Japanese Patent Application Laid-Open (JP-A) No. 2005-272728 and the like, can exhibit heat resistance and chemical resistance further superior to the heat resistance and chemical resistance of the aromatic polyether ketones.

Japanese Patent Application Laid-Open (JP-A) No. 2013-53194 reports that an aromatic polyketone with compatibility between high transparency and heat resistance can be obtained by directly polymerizing an alicyclic dicarboxylic acid and a 2,2'-dialkoxybiphenyl compound by Friedel-Crafts acylation. The aromatic polyketone has been expected to be applied to optical components.

Characteristics incapable of being obtained by inorganic materials are expected to be obtained in a case in which resin materials are applied to optical components. Examples of the characteristics include being lightweight, and being commonly softer than the inorganic materials. Examples of applications of the resin materials include materials which utilize lightweight properties and are substituted for glass for portable devices, coat materials, and flexible displays utilizing flexibility. Especially, attention has been particularly given to realization of the flexible displays in recent years.

SUMMARY OF INVENTION

Technical Problem

However, the aromatic polyketone polymerized from an alicyclic dicarboxylic acid and a 2,2'-dialkoxybiphenyl compound according to JP-A No. 2013-53194 is prone to cause a molded article to be hard although having excellent heat resistance and transparency. As a result, it is difficult to obtain a flexible film which can be bent.

The invention was made under such present circumstances. An embodiment of the invention is to provide an aromatic polyketone that has excellent heat resistance and transparency and is capable of forming a flexible film, an aromatic polyketone composition and an aromatic polyketone film including the aromatic polyketone, and an optical element and an image display apparatus including the aromatic polyketone film. An embodiment of the invention is to provide a method of producing an aromatic polyketone that has excellent heat resistance and transparency and is capable of forming a flexible film.

Solution to Problem

In order to solve the problems described above, the invention includes aspects <1> to <7> described below.

<1> An aromatic polyketone comprising, in a structural unit, at least one alicyclic skeleton and at least one carbon atom bound by two rotatable single bonds.

<2> An aromatic polyketone comprising a structural unit represented by the following Formula (1), the following Formula (2), or the following Formula (4), and a structural unit represented by the following Formula (5):

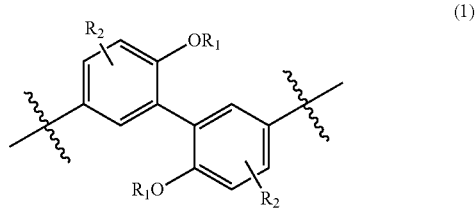

(1)

wherein, in Formula (1), each $R_1$ independently represents a hydrogen atom or a $C_1$-$C_{30}$ hydrocarbon group that may have a substituent, and each $R_2$ independently represents a hydrogen atom or a $C_1$-$C_{30}$ hydrocarbon group that may have a substituent;

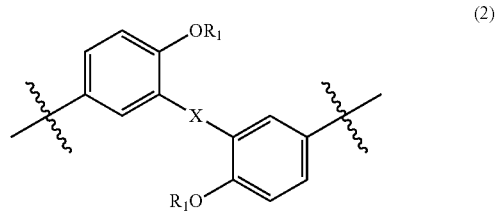

(2)

wherein, in Formula (2), each $R_1$ independently represents a hydrogen atom or a $C_1$-$C_{30}$ hydrocarbon group that may have a substituent, and X represents an oxygen atom or a divalent group represented by the following Formula (3):

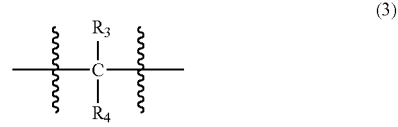

(3)

wherein, in Formula (3), each of $R_3$ and $R_4$ independently represents a hydrogen atom or a $C_1$-$C_{30}$ hydrocarbon group that may have a substituent;

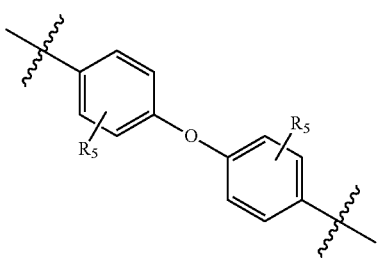
(4)

wherein, in Formula (4), each $R_5$ independently represents a hydrogen atom or a $C_1$-$C_{30}$ hydrocarbon group that may have a substituent;

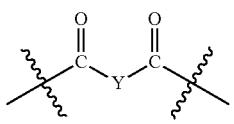
(5)

wherein, in Formula (5), Y represents a divalent group represented by the following Formula (6):

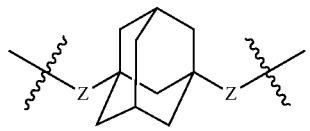
(6)

wherein, in Formula (6), a hydrogen atom in an adamantane skeleton may be substituted by a hydrocarbon group, an amino group, an oxo group, a hydroxyl group, or a halogen atom, and each Z independently represents a $C_1$-$C_{10}$ divalent saturated hydrocarbon group that may have a substituent.

<3> An aromatic polyketone obtained by conducting a condensation reaction, in an acid medium, between an aromatic monomer represented by the following Formula (1'), the following Formula (2'), or the following Formula (4'), and a dicarboxylic acid monomer represented by the following Formula (5'):

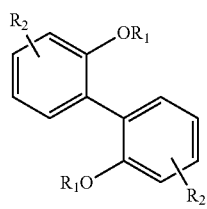
(1')

wherein, in Formula (1'), each $R_1$ independently represents a hydrogen atom or a $C_1$-$C_{30}$ hydrocarbon group that may have a substituent, and each $R_2$ independently represents a hydrogen atom or a $C_1$-$C_{30}$ hydrocarbon group that may have a substituent;

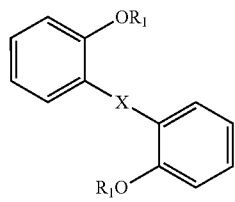
(2')

wherein, in Formula (2'), each $R_1$ independently represents a hydrogen atom or a $C_1$-$C_{30}$ hydrocarbon group that may have a substituent, and X represents an oxygen atom or a divalent group represented by the following Formula (3'):

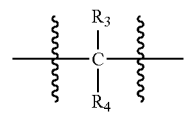
(3')

wherein, in Formula (3'), each of $R_3$ and $R_4$ independently represents a hydrogen atom or a $C_1$-$C_{30}$ hydrocarbon group that may have a substituent;

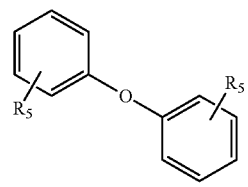
(4')

wherein, in Formula (4'), each $R_5$ independently represents a hydrogen atom or a $C_1$-$C_{30}$ hydrocarbon group that may have a substituent;

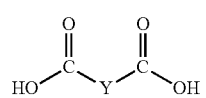
(5')

wherein, in Formula (5'), Y represents a divalent group represented by the following Formula (6'):

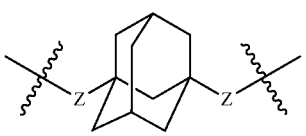
(6')

wherein, in Formula (6'), a hydrogen atom in an adamantane skeleton may be substituted by a hydrocarbon group, an amino group, an oxo group, a hydroxyl group, or a halogen atom, and each Z independently represents a $C_1$-$C_{10}$ divalent saturated hydrocarbon group that may have a substituent.

<4> An aromatic polyketone composition comprising the aromatic polyketone according to any one of <1> to <3>, and a solvent.

<5> An aromatic polyketone film comprising the aromatic polyketone according to any one of <1> to <3>.

<6> An optical element comprising the aromatic polyketone film according to <5>.

<7> An image display apparatus comprising the aromatic polyketone film according to <5>.

<8> A method of producing an aromatic polyketone, the method comprising conducting a condensation reaction, in an acid medium, between an aromatic monomer represented by the following Formula (1'), the following Formula (2'), or the following Formula (4'), and a dicarboxylic acid monomer represented by the following Formula (5'):

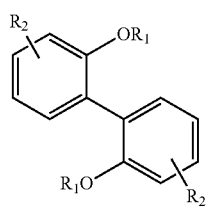
(1')

wherein, in Formula (1'), each $R_1$ independently represents a hydrogen atom or a $C_1$-$C_{30}$ hydrocarbon group that may have a substituent, and each $R_2$ independently represents a hydrogen atom or a $C_1$-$C_{30}$ hydrocarbon group that may have a substituent;

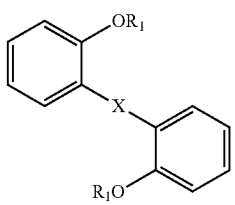
(2')

wherein, in Formula (2'), each $R_1$ independently represents a hydrogen atom or a $C_1$-$C_{30}$ hydrocarbon group that may have a substituent, and X represents an oxygen atom or a divalent group represented by the following Formula (3'):

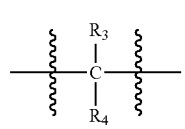
(3')

wherein, in Formula (3'), each of $R_3$ and $R_4$ independently represents a hydrogen atom or a $C_1$-$C_{30}$ hydrocarbon group that may have a substituent;

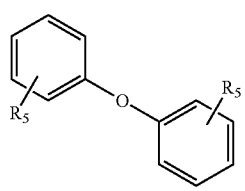
(4')

wherein, in Formula (4'), each $R_5$ independently represents a hydrogen atom or a $C_1$-$C_{30}$ hydrocarbon group that may have a substituent;

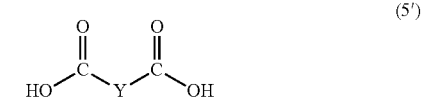
(5')

wherein, in Formula (5'), Y represents a divalent group represented by the following Formula (6'):

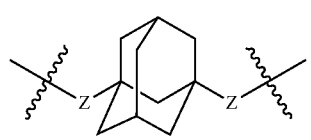
(6')

wherein, in Formula (6'), a hydrogen atom in an adamantane skeleton may be substituted by a hydrocarbon group, an amino group, an oxo group, a hydroxyl group, or a halogen atom, and each Z independently represents a $C_1$-$C_{10}$ divalent saturated hydrocarbon group that may have a substituent.

Advantageous Effects of Invention

In accordance with an embodiment of the invention, it is possible to provide an aromatic polyketone that has excellent heat resistance and transparency and is capable of forming a flexible film, an aromatic polyketone composition and an aromatic polyketone film including the aromatic polyketone, and an optical element and an image display apparatus including the aromatic polyketone film. In accordance with an embodiment of the invention, it is possible to provide a method of producing an aromatic polyketone that has excellent heat resistance and transparency and is capable of forming a flexible film.

BRIEF DESCRIPTION OF DRAWING

FIG. 1 is a view illustrating the $^{13}$C-NMR spectrum of polyketone PK1.

DESCRIPTION OF EMBODIMENTS

The invention will be described in detail below. However, the invention is not limited to embodiments described below. In the embodiments described below, components (also including element steps and the like) in the embodiments are not essential unless otherwise specified or considered to be theoretically obviously essential. The same also applies to numerical values and the ranges of the numerical values, and the invention is not restricted by the numerical values and the ranges.

A numerical range expressed by "x to y" herein includes the values of x and y in the range as the minimum and maximum values, respectively.

In a numerical range expressed in a stepwise manner herein, the upper or lower limit expressed in one numerical range may be replaced by the upper or lower limit in another numerical range expressed in a stepwise manner. In a numerical range expressed herein, the upper or lower limit of the numerical range may be replaced by values described in Examples.

"Film" herein encompasses the configuration of a shape formed on the entire surface as well as the configuration of a shape formed on part of the surface in the case of being viewed in a plan view.

"Step" herein encompasses not only an independent step but also a step of which the intended action is achieved even in a case in which the step is unable to be definitely distinguished from another step.

The term "layer" herein encompasses the configuration of a shape formed on the entire surface as well as the configuration of a shape formed on part of the surface in the case of being viewed in a plan view. The term "layering" refers to layering layers one on another, in which two or more layers may be coupled, or two or more layers may be releasable.

"Transparency" herein refers to a visible light transmission, and means at least that the transmission of visible light having a wavelength of 400 nm is 80% or more (based on a film thickness of 1 µm).

"Heat resistance" herein means that yellowing of a member including the aromatic polyketone of the invention due to heating is inhibited.

<Aromatic Polyketone and Method of Producing Aromatic Polyketone>

An aromatic polyketone of the present embodiment includes, in a structural unit, at least one alicyclic skeleton and at least one carbon atom bound by two rotatable single bonds.

Examples of the alicyclic skeletons include cyclopropane skeleton, cyclobutane skeleton, cyclopentane skeleton, cyclohexane skeleton, cycloheptane skeleton, cyclooctane skeleton, cubane skeleton, norbornane skeleton, tricyclo[5.2.1.0]decane skeleton, adamantane skeleton, diadamantane skeleton, and bicyclo[2.2.2]octane skeleton. Especially, adamantane skeleton is preferred from the viewpoint of heat resistance and solubility.

The at least one carbon atom included in the structural unit may be a divalent hydrocarbon group. The divalent hydrocarbon group may be bound to a group having an alicyclic skeleton and a carbonyl group by two rotatable single bonds. The divalent hydrocarbon group may be a $C_1$-$C_{10}$ divalent saturated hydrocarbon group which may have a substituent. Specific examples of the alicyclic skeleton in the group having the alicyclic skeleton are as described above.

Examples of the $C_1$-$C_{10}$ divalent saturated hydrocarbon which may have a substituent include methylene group, ethylene group, trimethylene group, methylethylene group, tetramethylene group, 1-methyltrimethylene group, 2-methyltrimethylene group, ethylethylene group, 1,1-dimethylethylene group, 1,2-dimethylethylene group, pentylene group, 1-methyltetramethylene group, 2-methyltetramethylene group, 1-ethyltrimethylene group, 2-ethyltrimethylene group, 1,1-dimethyltrimethylene group, 2,2-dimethyltrimethylene group, 1,2-dimethyltrimethylene group, propylethylene group, ethylmethylethylene group, hexylene group, 1-methylpentylene group, 2-methylpentylene group, 3-methylpentylene group, 1-ethyltetramethylene group, 2-ethyltetramethylene group, 1-propyltrimethylene group, 2-propyltrimethylene group, butylethylene group, 1,1-dimethyltetramethylene group, 2,2-dimethyltetramethylene group, 1,2-dimethyltetramethylene group, 1,3-dimethyltetramethylene group, 1,4-dimethyltetramethylene group, 1,2,3-trimethyltrimethylene group, 1,1,2-trimethyltrimethylene group, 1,1,3-trimethyltrimethylene group, 1,2,2-trimethyltrimethylene group, 1-ethyl-1-methyltrimethylene group, 2-ethyl-2-methyltrimethylene group, 1-ethyl-2-methyltrimethylene group, 2-ethyl-1-methyltrimethylene group, heptylene group, octylene group, nonylene group, and decylene group.

The aromatic polyketone of the present embodiment may include a structural unit represented by the following Formula (1), the following Formula (2), or the following Formula (4), and a structural unit represented by the following Formula (5). A portion indicated by a wavy line means a bonding hand. Hereinafter, the same applies to wavy lines in chemical formulae.

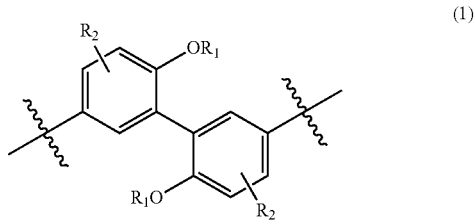

(1)

In Formula (1), each $R_1$ independently represents a hydrogen atom or a $C_1$-$C_{30}$ hydrocarbon group that may have a substituent, and each $R_2$ independently represents a hydrogen atom or a $C_1$-$C_{30}$ hydrocarbon group that may have a substituent.

The hydrocarbon group represented by $R_1$ is preferably a $C_1$-$C_{10}$ hydrocarbon group from the viewpoint of heat resistance, and more preferably a $C_1$-$C_5$ hydrocarbon group from the viewpoint of reaction control.

Examples of the hydrocarbon group represented by $R_1$ include saturated aliphatic hydrocarbon groups, unsaturated aliphatic hydrocarbon groups, and alicyclic hydrocarbon groups. Such saturated aliphatic hydrocarbon groups and unsaturated aliphatic hydrocarbon groups may be straight chain or branched chain. The hydrocarbon group represented by $R_1$ may be a combination of such hydrocarbon groups. Examples of the substituent include halogen atoms, $C_1$-$C_5$ alkoxy groups, and $C_2$-$C_5$ acyl groups. In a case in which the hydrocarbon group has a substituent, the number of carbon atoms in the hydrocarbon group is not intended to include the number of carbon atoms in the substituent. Hereinafter, the same applies.

Examples of the saturated aliphatic hydrocarbon groups include methyl group, ethyl group, n-propyl group, isopropyl group, n-butyl group, isobutyl group, sec-butyl group, t-butyl group, n-pentyl group, isopentyl group, sec-pentyl group, neo-pentyl group, t-pentyl group, n-hexyl group, n-heptyl group, n-octyl group, n-nonyl group, n-decyl group, n-icosanyl group, and n-triacontanyl group.

Examples of the unsaturated aliphatic hydrocarbon groups include alkenyl groups such as vinyl group and allyl group, and alkynyl groups such as ethynyl group.

Examples of the alicyclic hydrocarbon groups include cycloalkyl groups such as cyclopropyl group, cyclobutyl group, cyclopentyl group, cyclohexyl group, cycloheptyl group, cyclooctyl group, and norbornyl group, and cycloalkenyl groups such as cyclohexenyl group.

In Formula (1), $R_2$ is preferably a hydrogen atom or a $C_1$-$C_5$ hydrocarbon group from the viewpoint of heat resistance. Examples of such hydrocarbon groups include the same hydrocarbon groups as the hydrocarbon groups included in the examples in $R_1$ in Formula (1). Examples of the substituent include halogen atoms, $C_1$-$C_5$ alkoxy groups, and $C_2$-$C_5$ acyl groups.

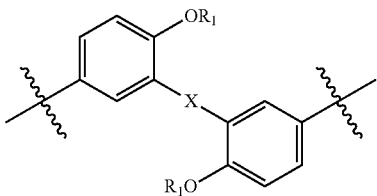

(2)

In Formula (2), each $R_1$ independently represents a hydrogen atom or a $C_1$-$C_{30}$ hydrocarbon group that may have a substituent, and X represents an oxygen atom or a divalent group represented by the following Formula (3). The details of $R_1$ in Formula (2) are the same as the details of $R_1$ in Formula (1).

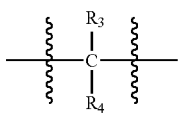

(3)

In Formula (3), each of $R_3$ and $R_4$ independently represents a hydrogen atom or a $C_1$-$C_{30}$ hydrocarbon group that may have a substituent. $R_3$ and $R_4$ are preferably $C_1$-$C_5$ hydrocarbon groups from the viewpoint of heat resistance. Examples of such hydrocarbon groups include the same hydrocarbon groups as the hydrocarbon groups included in the examples in $R_1$ in Formula (1). Examples of the substituent include halogen atoms, $C_1$-$C_5$ alkoxy groups, and $C_2$-$C_5$ acyl groups.

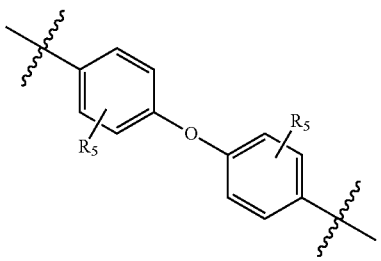

(4)

In Formula (4), each $R_5$ independently represents a hydrogen atom or a $C_1$-$C_{30}$ hydrocarbon group that may have a substituent. $R_5$ is preferably a $C_1$-$C_5$ hydrocarbon group from the viewpoint of heat resistance. Examples of such hydrocarbon groups include the same hydrocarbon groups as the hydrocarbon groups included in the examples in $R_1$ in Formula (1). Examples of the substituent include halogen atoms, $C_1$-$C_5$ alkoxy groups, and $C_2$-$C_5$ acyl groups.

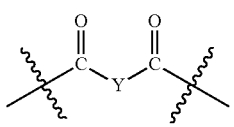

(5)

In Formula (5), Y represents a divalent group represented by the following Formula (6).

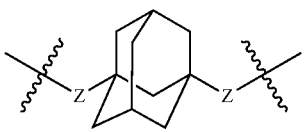

(6)

In Formula (6), a hydrogen atom in an adamantane skeleton may be substituted by a hydrocarbon group, an amino group, an oxo group, a hydroxyl group, or a halogen atom. Each Z independently represents a $C_1$-$C_{10}$ divalent saturated hydrocarbon group that may have a substituent. Z is preferably a $C_1$-$C_5$ saturated hydrocarbon group from the viewpoint of heat resistance. The presence of Z allows an aromatic polyketone film described later to be flexible.

Examples of the divalent hydrocarbon group represented by Z include methylene group, ethylene group, trimethylene group, methylethylene group, tetramethylene group, 1-methyltrimethylene group, 2-methyltrimethylene group, ethylethylene group, 1,1-dimethylethylene group, 1,2-dimethylethylene group, pentylene group, 1-methyltetramethylene group, 2-methyltetramethylene group, 1-ethyltrimethylene group, 2-ethyltrimethylene group, 1,1-dimethyltrimethylene group, 2,2-dimethyltrimethylene group, 1,2-dimethyltrimethylene group, propylethylene group, 1-ethyl-2-methylethylene group, 1-ethyl-1-methylethylene group, hexylene group, 1-methylpentylene group, 2-methylpentylene group, 3-methylpentylene group, 1-ethyltetramethylene group, 2-ethyltetramethylene group, 1-propyltrimethylene group, 2-propyltrimethylene group, butylethylene group, 1,1-dimethyltetramethylene group, 2,2-dimethyltetramethylene group, 1,2-dimethyltetramethylene group, 1,3-dimethyltetramethylene group, 1,4-dimethyltetramethylene group, 1,2,3-trimethyltrimethylene group, 1,1,2-trimethyltrimethylene group, 1,1,3-trimethyltrimethylene group, 1,2,2-trimethyltrimethylene group, 1-ethyl-l-methyltrimethylene group, 2-ethyl-2-methyltrimethylene group, 1-ethyl-2-methyltrimethylene group, 2-ethyl-1-methyltrimethylene group, heptylene group, octylene group, nonylene group, and decylene group.

A method of producing the aromatic polyketone of the present embodiment is not particularly limited as long as the aromatic polyketone includes, in a structural unit, at least one alicyclic skeleton and at least one carbon atom bound by two rotatable single bonds, or includes a structural unit represented by the above-described Formula (1), the above-described Formula (2), or the above-described Formula (4), and a structural unit represented by the above-described Formula (5).

The aromatic polyketone of the present embodiment can be obtained by, for example, conducting a condensation reaction in an acid medium between an aromatic monomer represented by the following Formula (1'), the following Formula (2'), or the following Formula (4'), and a dicarboxylic acid monomer represented by the following Formula (5').

The method of producing the aromatic polyketone of the present embodiment may include conducting a condensation reaction in an acid medium between an aromatic monomer represented by the following Formula (1'), the following Formula (2'), or the following Formula (4'), and a dicarboxylic acid monomer represented by the following Formula (5').

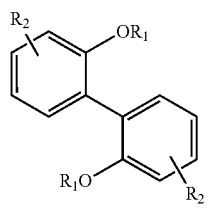
(1')

In Formula (1'), each $R_1$ independently represents a hydrogen atom or a $C_1$-$C_{30}$ hydrocarbon group that may have a substituent, and each $R_2$ independently represents a hydrogen atom or a $C_1$-$C_{30}$ hydrocarbon group that may have a substituent. The details of each of $R_1$ and $R_2$ in Formula (1') are the same as the details of $R_1$ and $R_2$ in Formula (1).

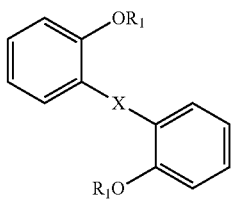
(2')

In Formula (2'), each $R_1$ independently represents a hydrogen atom or a $C_1$-$C_{30}$ hydrocarbon group that may have a substituent, and X represents an oxygen atom or a divalent group represented by the following Formula (3'). The details of $R_1$ in Formula (2') are the same as the details of $R_1$ in Formula (1).

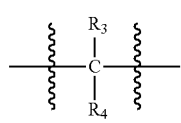
(3')

In Formula (3'), each of $R_3$ and $R_4$ independently represents a hydrogen atom or a $C_1$-$C_{30}$ hydrocarbon group that may have a substituent. The details of $R_3$ and $R_4$ in Formula (3') are the same as the details of $R_3$ and $R_4$ in Formula (3).

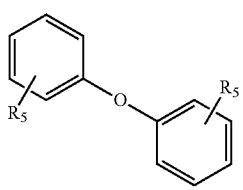
(4')

In Formula (4'), each $R_5$ independently represents a hydrogen atom or a $C_1$-$C_{30}$ hydrocarbon group that may have a substituent. The details of $R_5$ in Formula (4') are the same as the details of $R_5$ in Formula (4).

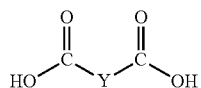
(5')

In Formula (5'), Y represents a divalent group represented by the following Formula (6').

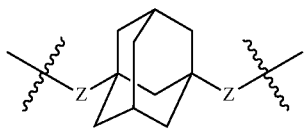
(6')

In Formula (6'), a hydrogen atom in an adamantane skeleton may be substituted by a hydrocarbon group, an amino group, an oxo group, a hydroxyl group, or a halogen atom. Each Z independently represents a $C_1$-$C_{10}$ divalent saturated hydrocarbon group that may have a substituent. The details of Z in Formula (6') are the same as the details of Z in Formula (6).

The acid medium used in the condensation reaction is not particularly limited. An organic solvent solution of aluminum chloride, an organic solvent solution of a trifluoroalkanesulfonic acid, polyphosphoric acid, a mixture of diphosphorus pentaoxide and an organic sulfonic acid, or the like can be used as the acid medium. A mixture of diphosphorus pentaoxide and an organic sulfonic acid is preferably used as the acid medium from the viewpoint of reactivity and handleability. Methanesulfonic acid is preferred as the organic sulfonic acid.

A mixture ratio between the diphosphorus pentaoxide and the organic sulfonic acid is preferably a mass ratio of diphosphorus pentaoxide: organic sulfonic acid=from 1:5 to 1:20, and more preferably from 1:5 to 1:10 from the viewpoint of the control of the mixture ratio and reactivity.

The amount of the blended acid medium with respect to the total amount of the aromatic monomer and the dicarboxylic acid monomer is not particularly limited as long as being an amount in which the aromatic monomer and the dicarboxylic acid monomer can be dissolved, and the acid medium can be used in an amount ranging from a catalytic amount to a solvent amount. The amount preferably ranges from 5 parts by mass to 100 parts by mass with respect to 1 part by mass of the dicarboxylic acid monomer from the viewpoint of reactivity and handleability.

A reaction temperature in the condensation reaction between the aromatic monomer and the dicarboxylic acid monomer is preferably from 10° C. to 100° C. for preventing the coloring and side reaction of the aromatic polyketone which is a reaction product, and more preferably from 20° C. to 100° C. for increasing a reaction rate to improve productivity.

A reaction atmosphere in the condensation reaction between the aromatic monomer and the dicarboxylic acid monomer is not particularly limited, and the reaction may be performed in an open system. However, since the presence of water tends to result in a decrease in the reactivity of the acid medium, it is preferable to use dry air, nitrogen, argon, or the like. It is more preferable to use nitrogen or argon in order to prevent an unexpected side reaction.

The condensation reaction between the aromatic monomer and the dicarboxylic acid monomer can be promoted by stirring a reaction liquid containing the aromatic monomer, the dicarboxylic acid monomer, and the acid medium. A stirring method is not particularly limited, and a magnetic stirrer, a mechanical stirrer, or the like can be used.

A reaction time in the condensation reaction between the aromatic monomer and the dicarboxylic acid monomer may vary depending on the reaction temperature, the molecular weight of the targeted aromatic polyketone, the kinds of the monomers used in the reaction, and the like. The reaction time is preferably from around 1 hour to around 120 hours for obtaining the aromatic polyketone having a sufficiently high molecular weight, and more preferably from 1 hour to 72 hours from the viewpoint of productivity.

A reaction pressure in the condensation reaction between the aromatic monomer and the dicarboxylic acid monomer is not particularly limited, and the reaction may be performed under any of ordinary pressure, increased pressure, and reduced pressure. It is preferable to perform the reaction under ordinary pressure from the viewpoint of a cost.

After the end of the condensation reaction between the aromatic monomer and dicarboxylic acid monomer, the reaction liquid and the poor solvent of an aromatic polyketone may be brought into contact with each other, thereby extracting impurities into a poor solvent layer and precipitating an aromatic polyketone. The precipitated aromatic polyketone can be separated from the liquid by a method such as filtration, decantation, or centrifugation. Thereafter, a step of re-dissolving the separated aromatic polyketone in the good solvent of the aromatic polyketone, re-bringing the resultant and the poor solvent of the aromatic polyketone into contact with each other, thereby precipitating an aromatic polyketone and extracting impurities into a poor solvent layer, and separating the precipitated aromatic polyketone from the liquid by a method such as filtration, decantation, or centrifugation may be further repeated.

<Aromatic Polyketone Composition>

An aromatic polyketone composition including the aromatic polyketone of the present embodiment and a solvent can be obtained by, for example, dissolving the aromatic polyketone of the present embodiment in the solvent. A method of dissolving the aromatic polyketone in the solvent is not particularly limited, and a method known in the art can be used. An insoluble constituent may also be filtered after the dissolution, if necessary.

Specific examples of aspects of the aromatic polyketone composition include varnishes, slurries, and mixed powders.

Examples of the solvent included in an aromatic polyketone composition of the present embodiment include γ-butyrolactone, ethyl lactate, propylene glycol monomethyl ether acetate, butyl acetate, benzyl acetate, ethoxyethylpropionate, 3-methylmethoxypropionate, N-methyl-2-pyrrolidone, N-cyclohexyl-2-pyrrolidone, N,N-dimethylformamide, N,N-dimethylacetamide, dimethylsulfoxide, hexamethylphosphorylamide, tetramethylene sulfone, diethyl ketone, diisobutyl ketone, methyl amyl ketone, cyclohexanone, propylene glycol monomethyl ether, propylene glycol monopropyl ether, propylene glycol monobutyl ether, dipropylene glycol monomethyl ether, xylene, mesitylene, ethylbenzene, propyl benzene, cumene, diisopropylbenzene, hexylbenzene, anisole, diglyme, dimethylsulfoxide, chloroform, dichloromethane, dichloroethane, and chlorobenzene. These solvents may be used singly, or in combination of plural kinds thereof.

The aromatic polyketone composition of the present embodiment may further include an additive and the like as well as the aromatic polyketone and the solvent. Examples of the additive include adhesive aids, surfactants, leveling agents, antioxidants, and ultraviolet degradation inhibitors.

<Aromatic Polyketone Film>

An aromatic polyketone film of the present embodiment includes the aromatic polyketone of the present embodiment. A method of producing the aromatic polyketone film of the present embodiment is not particularly limited. For example, the aromatic polyketone film of the present embodiment can be obtained using the aromatic polyketone composition of the present embodiment. The aromatic polyketone film including the aromatic polyketone of the present embodiment is more flexible than an aromatic polyketone film including a conventional aromatic polyketone polymerized from an alicyclic dicarboxylic acid and a 2,2'-dialkoxybiphenyl compound.

In order to obtain the aromatic polyketone film, the aromatic polyketone composition is applied to at least part of a surface of a substrate, thereby forming a composition layer. As a result, a substrate with an aromatic polyketone film, including the substrate and the aromatic polyketone film of the present embodiment disposed on at least part of the surface of the substrate.

A method of applying the aromatic polyketone composition to the substrate is not particularly limited as long as being a technique capable of forming the composition layer having an arbitrary shape at an arbitrary location on the substrate. For example, a dipping method, a spray method, a screen printing method, or a spin coating method is preferably used.

The substrate to which the aromatic polyketone composition is applied is not particularly limited, and examples thereof may include glass substrates, semiconductor substrates, metal oxide insulator substrates (for example, titanium oxide substrates and silicon oxide substrates), silicon nitride substrates, and transparent resin substrates such as triacetylcelluloses, transparent polyimides, polycarbonates, acrylic resins, and cycloolefin resins. The shape of the substrate is not particularly limited, and may be a plate shape or a film shape.

The aromatic polyketone composition of the present embodiment is applied (coated) to the substrate to form the composition layer, and the composition layer is then dried in a drying step. A method of drying the composition layer is not particularly limited, and examples thereof may include heating using a hot plate, an oven, or the like. The dried aromatic polyketone film in the state of being removed from the substrate can be used, if necessary.

The dried aromatic polyketone film may be further heat-treated, if necessary. A method of the heat treatment is not particularly limited, and the heat treatment can be performed using a box-type dryer, a hot-blast conveyer-type dryer, a quartz tube furnace, a hot plate, rapid thermal annealing, or an oven such as a vertical diffusion furnace, an infrared curing furnace, an electron-beam curing furnace, or a microwave curing furnace. Any of atmospheric air or an inert atmosphere such as nitrogen can be selected as an atmosphere condition in the heat treatment step.

<Optical Element and Image Display Apparatus>

An optical element and image display apparatus of the present embodiment include the aromatic polyketone film of the present embodiment. The aromatic polyketone film of the present embodiment applied to the optical element and image display apparatus of the present embodiment may be used as the substrate with an aromatic polyketone film, including a substrate and the aromatic polyketone film of the present embodiment disposed on at least part of a surface of the substrate.

For example, the substrate with the aromatic polyketone film, including the aromatic polyketone film of the present embodiment, may include the aromatic polyketone film of the present embodiment on at least one surface of a substrate such as the film-shaped transparent resin described above. Alternatively, the substrate with the aromatic polyketone film may include the aromatic polyketone film of the present embodiment on both the surfaces of the substrate such as the film-shaped transparent resin. In the substrate with the aromatic polyketone film, the aromatic polyketone film may be one layer or may have a plural-layer structure in which two or more layers are layered one on another.

The optical element and image display apparatus of the present embodiment can be obtained by, for example, affixing the substrate side of a transparent resin film or the like included in the substrate with the aromatic polyketone film to a member used in an LCD (liquid crystal display), an ELD (electroluminescence display), or the like with a tackiness agent, an adhesive, or the like.

The aromatic polyketone film of the present embodiment and various optical elements such as polarizing plates in which the aromatic polyketone film is used can be preferably used in various image display apparatuses such as liquid crystal display apparatuses. The image display apparatus of the present embodiment may have the same configuration as the configuration of a conventional image display apparatus except that the aromatic polyketone film of the present embodiment is used. In a case in which the image display apparatus of the present embodiment is a liquid crystal display apparatus, the image display apparatus can be produced by, for example, assembling, if appropriate, an optical element such as a liquid crystal cell and a polarizing plate, and each component such as a lighting system (backlight), if necessary, and incorporating a driving circuit into the assembly. The liquid crystal cell is not particularly restricted. As such liquid crystal cells, various types of liquid crystal cells such as a TN type, an STN type, and a π type can be used.

The image display apparatus of the present embodiment is used in any appropriate application. Examples of such applications include OA instruments such as desktop personal computers, notebook computers, and copying machines, portable instruments such as portable telephones, timepieces, digital cameras, personal digital assistants (PDAs), and portable game machines, household electrical instruments such as video cameras, televisions, and microwave ovens, vehicle-mounted instruments such as rearview monitors, monitors for car navigation systems, and car audios, exhibition instruments such as monitors for information for commercial stores, guard instruments such as surveillance monitors, and care/medical instruments such as monitors for care and medical monitors.

EXAMPLES

The invention will be further specifically described below with reference to Examples. However, the invention is not limited to the Examples unless departing from the gist of the invention. "Part(s)" and "%" are based on mass unless otherwise specified.

Example 1

Synthesis of Polyketone PK1

To a flask containing 10 mmol of 2,2'-dimethoxybiphenyl and 10 mmol of 1,3-adamantanediacetic acid, 30 mL of a mixture of diphosphorus pentaoxide and methanesulfonic acid (mass ratio of 1:10) was added, a nitrogen balloon was attached to the flask, and the mixture was stirred at 60° C. for 40 hours. After reaction, the reaction liquid was poured into 500 mL of methanol, and a generated precipitate was obtained by filtration. The obtained solid was washed with distilled water and methanol, and then dried, thereby obtaining polyketone PK1. The $^{13}$C-NMR spectrum of the obtained polyketone PK1 is illustrated in FIG. 1. The polyketone PK1 had a weight average molecular weight of 80000 and a number-average molecular weight of 20000.

Example 2

Preparation of Varnish with Polyketone PK1

The polyketone PK1 obtained in Example 1 was dissolved in N-methyl-2-pyrrolidone (NMP) so as to have a concentration of 20%, and the solution was filtered through a membrane filter made of polytetrafluoroethylene (pore diameter of 5 μm), thereby obtaining varnish with the polyketone PK1.

Example 3

Production of Film with Varnish with Polyketone PK1

The varnish with the polyketone PK1 obtained in Example 2 was coated on a glass substrate and a Kapton film by a bar coat method, thereby obtaining substrates with the polyketone PK1 film. Each of the obtained substrates with the polyketone PK1 film was dried for 3 minutes on a hot plate heated to 120° C., and the transparency, heat resistance, and flex resistance of each substrate were then evaluated by a technique described later.

Comparative Synthesis Example

Synthesis of Polyketone PK2

Polyketone PK2 was obtained in the same manner as the manner of Example 1 except that 1,3-adamantanedicarboxylic acid was used instead of 1,3-adamantanediacetic acid. The obtained polyketone PK2 had a weight average molecular weight of 90000 and a number-average molecular weight of 20000.

Comparative Preparation Example

Preparation of Varnish with Polyketone PK2

Varnish with the polyketone PK2 was obtained in the same manner as the manner of
Example 2 except that the polyketone PK2 was used instead of the polyketone PK1.

Comparative Example

Production of Film with Varnish with Polyketone PK2

A film with the varnish with the polyketone PK2 was obtained and evaluated in the same manner as the manner of Example 3 except that the varnish with the polyketone PK2 was used instead of the varnish with the polyketone PK1.

(Measurement of Molecular Weight)

The molecular weights were measured by a GPC method using, as an eluent, tetrahydrofuran (THF) in which 0.1% of tetrabutylammonium nitrate (TBA.NO$_3$) was dissolved, and determined in terms of standard polystyrene. The details thereof are as follows.

Apparatus name: RI-8020 (detector), DP-8020 (pump), SD-8022 (degasser) (Tosoh Corporation)
Column: Gelpack GL-A150, GL-A160, GL-A170 (product name, Hitachi Chemical Co., Ltd.)
Detector: RI detector
Flow rate: 1 mL/min (Evaluation of Transparency)

The transmittance of ultraviolet light at 400 nm through the glass substrate with the polyketone film obtained in Example 3 or Comparative Example was measured by an ultraviolet and visible absorption spectrum method using an ultraviolet and visible spectrophotometer ("U-3310 Spectrophotometer" Hitachi High-Technologies Corporation). By using a glass substrate without the film as a reference, the transmittance of the polyketone film in terms of 1μm is indicated in Table 1.

(Evaluation of Heat Resistance)

The glass substrate with the polyketone film obtained in Example 3 or Comparative Example was left to stand in an oven at 200° C. for 24 hours, and the transmittance of ultraviolet light at 400 nm was measured by an ultraviolet and visible absorption spectrum method using an ultraviolet and visible spectrophotometer ("U-3310 Spectrophotometer" Hitachi High-Technologies Corporation). The presence or absence of a crack in the film was visually confirmed. By using a glass substrate without the film as a reference, the transmittance of the polyketone film in terms of 1 μm is indicated in Table 1. The presence or absence of a crack in the film is also indicated in Table 1.

(Evaluation of Flex Resistance)

The Kapton film with the aromatic polyketone film obtained in Example 3 or Comparative Example was evaluated by a mandrel test (cylindrical mandrel method). The test was conducted in conformance with JIS K5600-5-1:1999. The diameter of the mandrel was changed from 25 mm to 3 mm, and the presence or absence of generation of a crack was visually confirmed. The minimum diameter of the mandrel in which no crack was generated is indicated in Table 1.

TABLE 1

| | Transmittance after [%] | Transmittance after heating [%] | Crack after heating | Mandrel diameter in mandrel test [mm] |
|---|---|---|---|---|
| Example 3 | 90 | 90 | Absent | 3 |
| Comparative Example | 90 | 90 | Present | 25 |

As indicated in Table 1, the aromatic polyketone of the present embodiment exhibits the transmittance and heat resistance equivalent to the transmittance and heat resistance of the conventional aromatic polyketone, and further has excellent flex resistance.

The entire disclosure of Japanese Patent Application No. 2015-20442, filed on Feb. 4, 2015, is incorporated herein by reference.

All documents, patent applications, and technical standards described in this specification are herein incorporated by reference to the same extent as if each individual document, patent application, or technical standard was specifically and individually indicated to be incorporated by reference.

INDUSTRIAL APPLICABILITY

In accordance with an embodiment of the invention, an aromatic polyketone film excellent in transparency, heat resistance, and flex resistance can be obtained, and can be used as a flexible transparent heat-resisting material.

The invention claimed is:

1. An aromatic polyketone comprising a structural unit including at least one alicyclic skeleton and at least one carbon atom bound by two rotatable single bonds, the structural unit being represented by the following Formula (5):

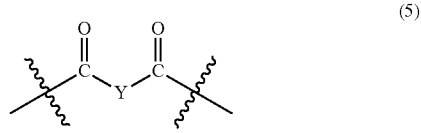

wherein, in Formula (5), Y represents a divalent group represented by the following Formula (6):

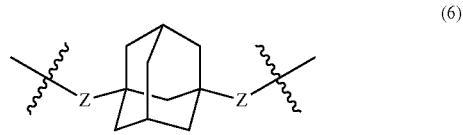

wherein, in Formula (6), a hydrogen atom in an adamantane skeleton may be substituted by a hydrocarbon group, an amino group, an oxo group, a hydroxyl group, or a halogen atom, and each Z independently represents a $C_1$-$C_{10}$ divalent saturated hydrocarbon group that may have a substituent.

2. An aromatic polyketone comprising a structural unit represented by the following Formula (1), the following Formula (2), or the following Formula (4); and a structural unit represented by the following Formula (5):

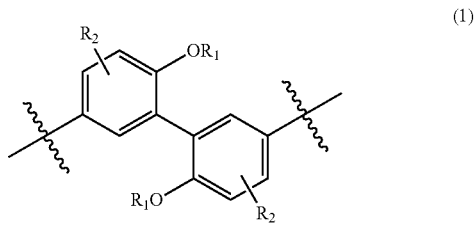

wherein, in Formula (1), each $R_1$ independently represents a hydrogen atom or a $C_1$-$C_{30}$ hydrocarbon group that may have a substituent, and each $R_2$ independently represents a hydrogen atom or a $C_1$-$C_{30}$ hydrocarbon group that may have a substituent;

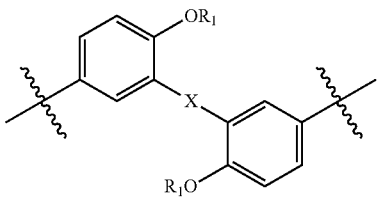

(2)

wherein, in Formula (2), each $R_1$ independently represents a hydrogen atom or a $C_1$-$C_{30}$ hydrocarbon group that may have a substituent, and X represents an oxygen atom or a divalent group represented by the following Formula (3):

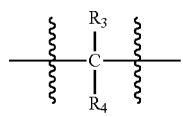

(3)

wherein, in Formula (3), each of $R_3$ and $R_4$ independently represents a hydrogen atom or a $C_1$-$C_{30}$ hydrocarbon group that may have a substituent;

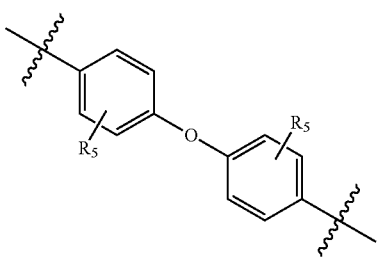

(4)

wherein, in Formula (4), each $R_5$ independently represents a hydrogen atom or a $C_1$-$C_{30}$ hydrocarbon group that may have a substituent;

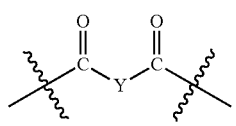

(5)

wherein, in Formula (5), Y represents a divalent group represented by the following Formula (6):

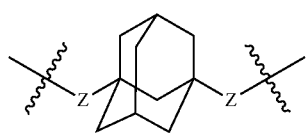

(6)

wherein, in Formula (6), a hydrogen atom in an adamantane skeleton may be substituted by a hydrocarbon group, an amino group, an oxo group, a hydroxyl group, or a halogen atom, and each Z independently represents a $C_1$-$C_{10}$ divalent saturated hydrocarbon group that may have a substituent.

3. An aromatic polyketone obtained by conducting a condensation reaction, in an acid medium, between an aromatic monomer represented by the following Formula (1'), the following Formula (2'), or the following Formula (4'); and a dicarboxylic acid monomer represented by the following Formula (5'):

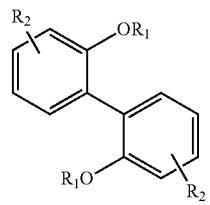

(1')

wherein, in Formula (1'), each $R_1$ independently represents a hydrogen atom or a $C_1$-$C_{30}$ hydrocarbon group that may have a substituent, and each $R_2$ independently represents a hydrogen atom or a $C_1$-$C_{30}$ hydrocarbon group that may have a substituent;

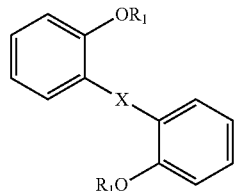

(2')

wherein, in Formula (2'), each $R_1$ independently represents a hydrogen atom or a $C_1$-$C_{30}$ hydrocarbon group that may have a substituent, and X represents an oxygen atom or a divalent group represented by the following Formula (3'):

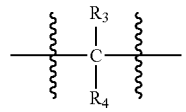

(3')

wherein, in Formula (3'), each of $R_3$ and $R_4$ independently represents a hydrogen atom or a $C_1$-$C_{30}$ hydrocarbon group that may have a substituent;

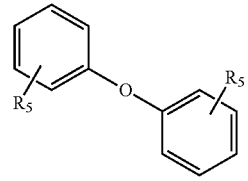

(4')

wherein, in Formula (4'), each $R_5$ independently represents a hydrogen atom or a $C_1$-$C_{30}$ hydrocarbon group that may have a substituent;

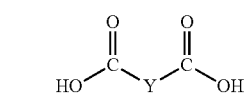

wherein, in Formula (5'), Y represents a divalent group represented by the following Formula (6'):

wherein, in Formula (6'), a hydrogen atom in an adamantane skeleton may be substituted by a hydrocarbon group, an amino group, an oxo group, a hydroxyl group, or a halogen atom, and each Z independently represents a $C_1$-$C_{10}$ divalent saturated hydrocarbon group that may have a substituent.

4. A method of producing an aromatic polyketone, the method comprising conducting a condensation reaction, in an acid medium, between an aromatic monomer represented by the following Formula (1'), the following Formula (2'), or the following Formula (4'); and a dicarboxylic acid monomer represented by the following Formula (5'):

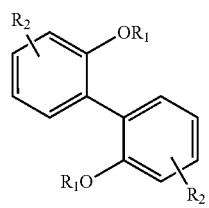

wherein, in Formula (1'), each $R_1$ independently represents a hydrogen atom or a $C_1$-$C_{30}$ hydrocarbon group that may have a substituent, and each $R_2$ independently represents a hydrogen atom or a $C_1$-$C_{30}$ hydrocarbon group that may have a substituent;

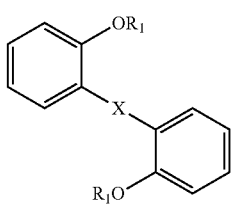

wherein, in Formula (2'), each $R_1$ independently represents a hydrogen atom or a $C_1$-$C_{30}$ hydrocarbon group that may have a substituent, and X represents an oxygen atom or a divalent group represented by the following Formula (3'):

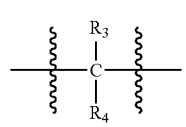

wherein, in Formula (3'), each of $R_3$ and $R_4$ independently represents a hydrogen atom or a $C_1$-$C_{30}$ hydrocarbon group that may have a substituent;

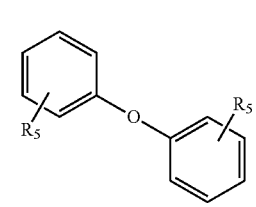

wherein, in Formula (4'), each $R_5$ independently represents a hydrogen atom or a $C_1$-$C_{30}$ hydrocarbon group that may have a substituent;

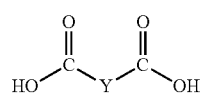

wherein, in Formula (5'), Y represents a divalent group represented by the following Formula (6'):

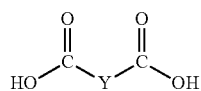

wherein, in Formula (6'), a hydrogen atom in an adamantane skeleton may be substituted by a hydrocarbon group, an amino group, an oxo group, a hydroxyl group, or a halogen atom, and each Z independently represents a $C_1$-$C_{10}$ divalent saturated hydrocarbon group that may have a substituent.

5. An aromatic polyketone composition comprising the aromatic polyketone according to claim 1, and a solvent.

6. An aromatic polyketone composition comprising the aromatic polyketone according to claim 2, and a solvent.

7. An aromatic polyketone composition comprising the aromatic polyketone according to claim 3, and a solvent.

8. An aromatic polyketone film comprising the aromatic polyketone according to claim 1.

9. An aromatic polyketone film comprising the aromatic polyketone according to claim 2.

10. An aromatic polyketone film comprising the aromatic polyketone according to claim 3.

11. An optical element comprising the aromatic polyketone film according to claim 8.

12. An optical element comprising the aromatic polyketone film according to claim 9.

13. An optical element comprising the aromatic polyketone film according to claim 10.

14. An image display apparatus comprising the aromatic polyketone film according to claim 8.

15. An image display apparatus comprising the aromatic polyketone film according to claim 9.

16. An image display apparatus comprising the aromatic polyketone film according to claim 10.

* * * * *